Nov. 17, 1953  T. M. LOWE  2,659,384
FLUID PRESSURE RESPONSIVE FEED CONTROL VALVE
Filed April 19, 1949
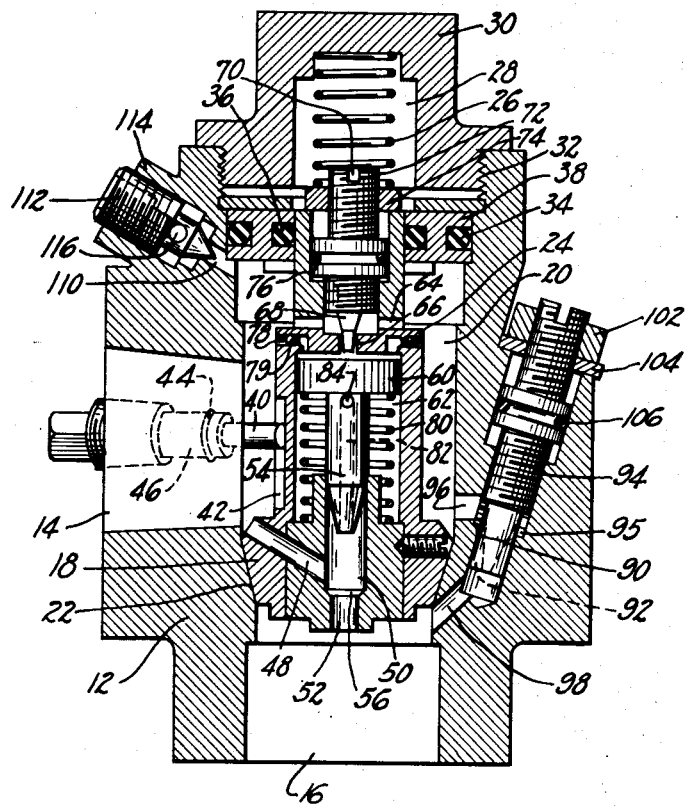
INVENTOR.
THEODORE M. LOWE
BY
M. A. Hobbs
ATTORNEY Patented Nov. 17, 1953

2,659,384

UNITED STATES PATENT OFFICE 2,659,384

FLUID PRESSURE RESPONSIVE FEED CONTROL VALVE

Theodore M. Lowe, Detroit, Mich., assignor to Bendix Aviation Corporation, South Bend, Ind., a corporation of Delaware Application April 19, 1949, Serial No. 88,290

6 Claims. (Cl. 137—599.2)

The present invention relates to valves, and more particularly to hydraulic or pneumatic feed control valves.

One of the principal objects of the present invention is to provide a relatively simple, compact and easily adjustable valve for automatically variably controlling the rate of movement of a hydraulic or pneumatic motor or other device.

Another object of the invention is to provide an infinitely variable regulating valve of simple construction for controlling the rate at which a tool, work holding means and the like on power equipment, such as drilling, reaming and milling machinery are advanced to operating position, fed during performance of an operation and returned to non-operating position.

Further objects and advantages of my invention will appear from the following description and accompanying drawings, wherein only one embodiment of the invention is disclosed. The invention is not limited to any particular embodiment, but is understood to be available for many applications wherein a hydraulic or pneumatic motor is required to perform an operation at a variable rate of speed.

In the drawing, there is shown a cross-sectional view of a feed valve embodying my invention.

Referring more specifically to the drawing, numeral 12 designates a valve body, 14 a main fluid inlet for receiving fluid under pressure from a source, such as a pump or an accumulator, 16 a main fluid outlet through which the fluid is supplied to a fluid actuated motor or the like. For the purpose of the present description, the system in which the present valve forms an element will be considered a conventional hydraulic circuit.

The main fluid passageway through the valve body 12 is controlled by a main valve 18 adapted to reciprocate in a cylindrical chamber 20 and to seat on a valve seat 22 formed in the side walls of the valve body 12. The main valve is supported by a body member or stem 24 urged in the valve closing direction by a coil spring 26 disposed in a chamber 28 and reacting between one end of said stem and the interior wall of a cap member 30, said cap being secured in place on the valve body by any suitable means such as by screw threads, as shown at 32. Chamber 28 in cap 30 is sealed from the cylindrical chamber 20 of the valve body by sealing rings 34 and 36 seated in an annular member 38 mounted on the upper end of stem 24. The main valve assembly is prevented from rotating in the cylindrical chamber by a pin 40 extending through the main body wall into a longitudinal slot 42 in the side wall of valve stem 24, said pin being sealed by an annular ring 44 and secured in place by threaded engagement with a fixed sleeve 46.

A fluid passageway is provided through the main valve 18 to connect fluid inlet 14 with fluid outlet 16 and consists of a conduit 48, chamber 50 and conduit 52 controlled by a valve 54 adapted to reciprocate in chamber 50 and to seat on valve seat 56. Valve 54 is actuated by a piston 60 disposed in a cylinder 62 which is connected with chamber 20 through a plurality of conduits 64 and a metering orifice 66, the effective size of said orifice being controlled by an adjustment valve 68 threadedly received in the upper end of the main valve assembly. This valve is adapted to be adjusted to any desired setting by the use of a screw driver placed in the slot 70 on the upper end of the valve member 72. The valve is locked in place after a setting has been made by a nut 74 threadedly received on the upper end of member 72 and bearing against the upper end of the main valve assembly. An annular sealing ring 76 is provided around the valve member 72 to prevent the hydraulic fluid from leaking from chamber 20 into chamber 28. To permit rapid discharge of fluid from cylinder 62 above piston 60 and thus rapid return of said piston to its uppermost position, one or more passages 78 controlled by check valves 79 are provided in the upper end of cylinder 62. The piston 60 is urged in the valve opening direction by a spring 80 reacting between the lower end of cylinder 62 and the under side of piston 60. Any fluid which may find its way into cylinder 62 under piston 60 is discharged therefrom through conduit 82 and port 84 in valve 54 when the piston moves in the valve closing direction.

An adjustable metering orifice 90 is provided to supply the fluid to the hydraulic motor during the tool feed stroke and consists of a triangularly shaped slot 92 in the lower end of valve 94 and an annular groove 95 in the valve body around said valve in communication with the slot, said orifice being connected with chamber 20 by conduit 96 and with the main fluid outlet by conduit 98. Valve 94 is threadedly received in the valve body and is locked in any desired position by a nut 102 threadedly received on the upper end of valve 94 and adapted to seat on a washer 104 resting against a shoulder of said valve body. An annular sealing ring 106 seals the shaft and the valve body in a fluid-tight relationship.

In order to remove the air or any vapor accumulating in the upper end of cylindrical chamber 20, a bleed 110 is provided in the body to connect the upper end of said chamber with the atmosphere. This bleed is controlled by a valve 112 threadedly received in a boss 114 formed integrally with the valve body. When valve 112 is opened, the air flows through bleed 110 into a passage 116 in the interior of valve 112 and thence to the atmosphere. During normal operation of the present feed valve, valve 112 is held in completely closed position as shown in the drawing.

In the operation of the present valve in a conventional hydraulic circuit, with main valve 18 in closed position and valve 54 withdrawn from its seat as shown in the drawing, the hydraulic fluid such as oil enters the feed valve through the main fuel inlet 14, flows through conduit 48, chamber 50 and conduit 52 and also through conduit 96, orifice 90 and conduit 98, leaving the said valve through the main fluid outlet 16, from where it is delivered to a hydraulic motor or the like. With the valve elements in the positions as now described and as shown in the drawing, the cutting tool or the like is being rapidly advanced to operative position. During this time, the hydraulic fluid is also flowing through passages 64 and orifice 66 into the upper end of cylinder 62 on the top side of piston 60, urging said piston and valve 54 downwardly, the rapid advance step continuing so long as valve 54 remains unseated. This is controlled by the time required for the fluid to urge valve 54 to its seated position. The length of time required for the fluid in chamber 62 to seat valve 54 and thereby close orifice 56 is easily regulated by adjustment valve 68.

After orifice 56 has been completely closed by valve 54, the only fluid flowing through the valve passes through the main metering orifice 90. During this time, the cutting tool is being fed into the work. At the completion of the feed stroke, a valve, either manually or automatically actuated upstream from the present feed valve, is opened to relieve the pressure on the upstream side of the feed valve. When the pressure on the upstream side decreases below the pressure on the downstream side of the feed valve, the differential in pressure across main valve 18 forces said latter valve upwardly, unseating said valve, thereby permitting fluid to flow rapidly from the main fluid outlet 16 to the main fluid inlet 14, thus causing the hydraulic motor to return the cutting tool rapidly to its non-operative position.

When the pressure on the upstream side of the valve is again increased for a repeat operation, the high pressure on the upstream side of the valve, together with spring 26 immediately closes main valve 18. The remainder of the operation of the feed valve throughout the cycle is the same as that described above.

Although only one embodiment of the present invention has been illustrated herein, it should be understood that many modifications may be made without departing from the scope of the invention. For example, the feed valve may be arranged to include a plurality of valves such as the one shown at numeral 54, so that several steps of various speeds in the cycle may be obtained. Other modifications may be made to suit requirements.

I claim:

1. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds the pressure on the inlet side and to be closed when the pressure on the inlet side thereof exceeds the pressure on the outlet side, a second passageway connecting said inlet and outlet passages, a valve in said second passageway, a cylinder, a piston in said cylinder connected to said second mentioned valve for urging said valve toward closed position, means for biasing said second mentioned valve toward an open position, a conduit connecting said cylinder with the first mentioned passageway on the inlet side of said first mentioned valve, a restriction in said conduit, and a valve adapted to vary the effective size of said restriction, said piston being adapted to move in the direction to open the valve controlled thereby when the pressure on the outlet side of said first mentioned valve exceeds the pressure on the inlet side.

2. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds by a predetermined amount the pressure on the inlet side and to be closed when the pressure on the inlet side thereof exceeds the pressure on the outlet side, a second passageway connecting said inlet and outlet passages, a valve in said second passage, a cylinder, a piston in said cylinder connected to said second mentioned valve for urging said valve toward closed position, an orifice connecting said cylinder with the first mentioned passageway on the inlet side of said first mentioned valve, means for moving said last mentioned valve toward open position, and a third passageway having a restriction therein connecting the inlet passage with the outlet passage.

3. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds the pressure on the inlet side and adapted to be closed when the pressure on the inlet side thereof exceeds the pressure on the outlet side, a second passageway connecting said inlet and outlet passages, a valve in said second passageway, a cylinder, a piston in said cylinder connected to said second mentioned valve for urging said valve toward closed position, means for biasing said second mentioned valve toward an open position, an orifice connecting said cylinder with the first mentioned passageway on the inlet side of said first mentioned valve, said piston being adapted to move in the direction to open the valve controlled thereby when the pressure on the outlet side of said first mentioned valve exceeds the pressure on the inlet side, a third passageway connecting the inlet passage to the outlet passage, a restriction in said third mentioned passageway, and a valve for varying the effective size of said restriction.

4. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds the pressure on the inlet side, a spring for urging said valve toward closed position, a second passageway connecting said inlet and outlet passages, a valve in said second passageway, a cylinder, a piston in said cylinder connected to said second mentioned valve for urging said valve toward closed position, a conduit connecting said cylinder with the first mentioned passageway on the inlet side of said first mentioned valve, an orifice in said conduit, a valve adapted to vary the effective size of said orifice, a spring for urging said second mentioned valve toward open position, a third passageway connecting the inlet passage with the outlet passage, a restriction in said third mentioned passageway, and a valve for varying the effective size of said restriction.

5. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds the pressure on the inlet side and to be closed when the pressure on the inlet side thereof exceeds the pressure on the outlet side, a second passageway connecting said inlet and outlet passages, a valve in said second passageway, a chamber, means for biasing said second mentioned valve toward an open position, a movable member forming one wall of said chamber and operatively connected to said second mentioned valve for urging said valve toward closed position, and a conduit connecting said cylinder with the first mentioned passageway on the inlet side of said first mentioned valve, said member being adapted to move in the direction to open the valve controlled thereby when the pressure on the outlet side exceeds the pressure on the inlet side of said first mentioned valve.

6. A feed control device comprising a housing, a fluid inlet passage, a fluid outlet passage, a passageway connecting said inlet and outlet passages, a pressure responsive valve in said passageway adapted to be opened when the pressure on the outlet side of said valve exceeds the pressure on the inlet side and to be closed when the pressure on the inlet side thereof exceeds the pressure on the outlet side, a second passageway connecting said inlet and outlet passages, a valve in said second passageway, a chamber, a movable member forming one wall of said chamber and operatively connected to said second mentioned valve for urging said valve toward closed position, means for biasing said second mentioned valve toward an open position, a conduit connecting said cylinder with the first mentioned passageway on the inlet side of said first mentioned valve, a restriction in said conduit, and a valve adapted to vary the effective size of said restriction, said member being adapted to move in the direction to open the valve controlled thereby when the pressure on the outlet side exceeds the pressure on the inlet side of said first mentioned valve.

THEODORE M. LOWE.

References Cited in the file of this patent
UNITED STATES PATENTS

| Number | Name | Date |
|---|---|---|
| 701,983 | Yale | June 10, 1902 |
| 966,691 | Killing | Aug. 9, 1910 |
| 1,697,865 | Hahn | Jan. 8, 1929 |
| 2,095,560 | Vickers | Oct. 12, 1937 |